B. KUHNE.
CLAMP UNIT FOR HOSE CONNECTIONS AND PIPE CONNECTIONS.
APPLICATION FILED DEC. 22, 1919.
1,384,962.
Patented July 19, 1921.
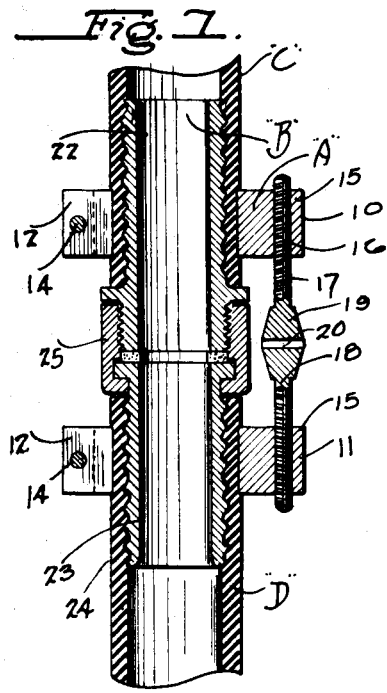
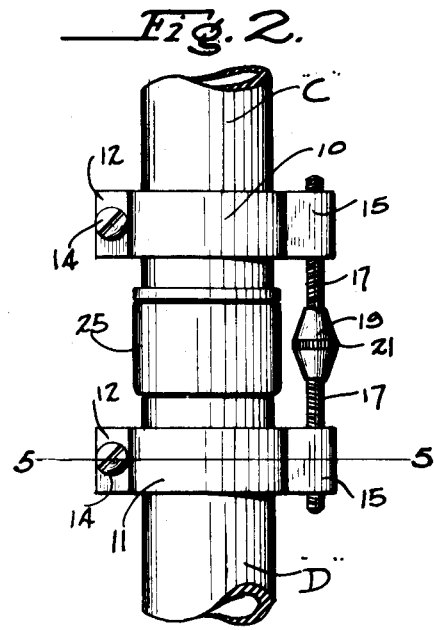
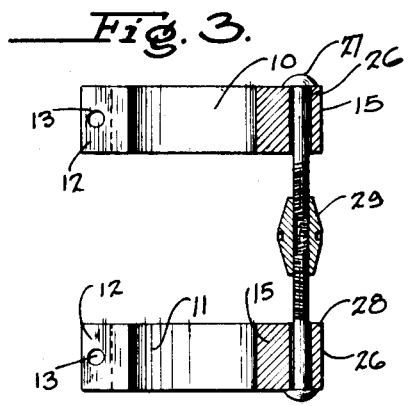
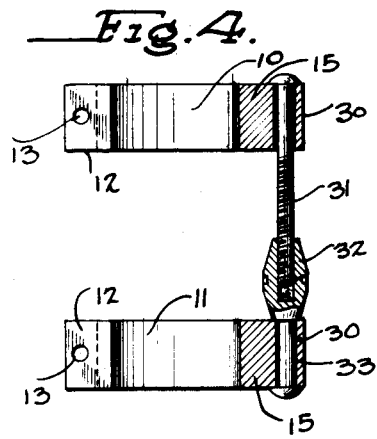
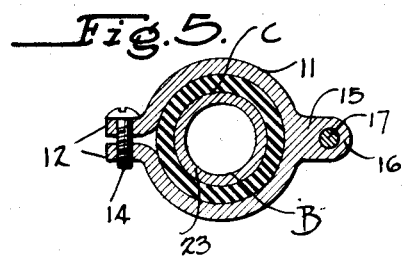
Beat Kuhne
Inventor

UNITED STATES PATENT OFFICE.

BEAT KUHNE, OF LEWISTOWN, MONTANA.

CLAMP UNIT FOR HOSE CONNECTIONS AND PIPE CONNECTIONS.

1,384,962.  Specification of Letters Patent.  Patented July 19, 1921.

Application filed December 22, 1919. Serial No. 346,512.

*To all whom it may concern:*

Be it known that I, BEAT KUHNE, a citizen of the United States, residing at Lewistown, in the county of Fergus and State of Montana, have invented certain new and useful Improvements in Clamp Units for Hose Connections and Pipe Connections, of which the following is a specification.

This invention relates to attachments for hose couplings and connections, and the primary object of the invention is to provide in addition to the ordinary coupling means to absolutely prevent the separation of the hose sections, or hose and nozzle.

It has been found that in the use of the ordinary hose and nozzle coupling that the portions of the hose sections or the hose and nozzle are liable to be separated or blown apart when the hose is used with water or other fluid under a high pressure.

It is therefore another object of the invention to provide a novel attachment for use either in connection with hose couplings or hose and nozzle couplings for effectively holding the hose sections or hose and nozzle in operative position against separation.

A further object of the invention is to provide an improved hose attachment embodying a pair of adjustable clamping collars for engaging the hose sections or hose and nozzle having means for adjustably connecting the same together, so as to permit the use of the device on couplings of various sizes.

A still further object of the invention is to provide an improved device of the above character which is durable and efficient, one that is simple and easy to manufacture, and one which can be placed upon the market at a reasonable cost.

Other objects of the invention will appear in the following detailed description taken in connection with the drawings, forming a part of this specification, in which drawings:

Figure 1 is a longitudinal section through a hose and coupling showing the improved device applied thereto.

Fig. 2 is an elevation of the same.

Fig. 3 is a longitudinal section through a modified form of the device.

Fig. 4 is a longitudinal section through a still further modified form of the device, and Fig. 5 is a detail transverse section taken on the line 5—5 of Fig. 2.

Referring to the drawings, in detail, wherein similar reference characters designate corresponding parts throughout the several views, the letter A indicates the improved attachment used in connection with a coupling B for a pair of pipe sections C and D.

While the attachment A is shown as used in connection with a hose coupling for a pair of hose sections, it is to be understood that the same is also to be used for holding a hose nozzle on a hose section.

The improved attachment A includes a pair of split annular collars 10 and 11, having outwardly projecting radial ears 12 formed on the terminals thereof. The ears 12 are provided with alined openings 13 for the reception of screws or other adjustable fastening elements 14, which are adapted to contract the collars so as to firmly clamp the same on the hose sections or on the hose section and hose nozzle (not shown). Each of the collars 10 and 11 diametrically opposite the lugs or ears 12 are provided with outwardly extending lugs 15, which are provided with oppositely threaded bores 16. The oppositely threaded bores 16 of the lugs 15 are adapted to receive the oppositely threaded shanks 17 of a double ended bolt 18, having an enlarged central connecting body 19. The connecting body is provided with a diametrical aperture 20 for the reception of a tool, so as to facilitate the rotation of the double ended bolt. The outer central surface of the body 19 may be provided with a knurled or serrated portion 21, so that the same may be gripped by the fingers to permit the turning thereof.

The coupling B for uniting the hose sections C and D may be of the ordinary or any preferred construction and as shown includes the tubular bodies 22 and 23, which are adapted to be inserted into the respective ends of the hose sections, and the outer surface of the tubular bodies are threaded or provided with serrations 24. The tubular bodies 22 and 23 are connected together in any suitable manner as shown at 25.

The split collars 10 and 11 engage the hose sections C and D at the portion thereof in which the tubular bodies 22 and 23 engage and the clamps or the split collars 10 and 11 are adapted to hold the hose sections on the tubular body. The double ended bolt firmly holds the collars against separation in relation to each other and thereby prevents the hose sections from separating. The double ended bolt permits the collars to be adjusted toward or away from each other so that the attachment can be used on any style of coupling.

In Fig. 3 is illustrated a slightly modified form of the invention, and in this form the lugs 15 are provided with smooth bores 26 which receive the outer headed ends of bolts 27 and 28. The bolts are oppositely threaded and the inner ends of the same are fitted in an oppositely threaded nut 29. The attachment may be used in the same manner as the attachment shown in Figs. 1 and 2 and by turning the nut 29 the collars 10 and 11 can be brought toward or away from each other.

In Fig. 4 is illustrated a still further modified form of the invention for bringing the collars 10 and 11 toward each other and in this form the lugs 15 are provided with smooth bores 30 and the collar 10 receives the smooth headed portion of a bolt 31 on which is adapted to be threaded the nut 32 having the shank 33 which is fitted in the bore of the collar 11. The nut 32 is freely rotatable and permits adjustment of the same on the bolt 31 for bringing the collars toward and away from each other.

From the foregoing description, it can be seen that an improved attachment is provided which will effectively prevent separation of a hose section and a hose nozzle.

Changes in details may be made without departing from the spirit or scope of my invention; but,

I claim:

In a hose coupling, a pair of collars having a split formed therein, the terminals of the collars having outwardly projecting ears, means adjustably connecting the ears of each collar together, outwardly extending lugs formed on each of the collars diametrically opposite to the ears, the lugs having alined bores formed therein, and adjustable means for engaging the bores for connecting the collars together.

BEAT KUHNE.